UNITED STATES PATENT OFFICE.

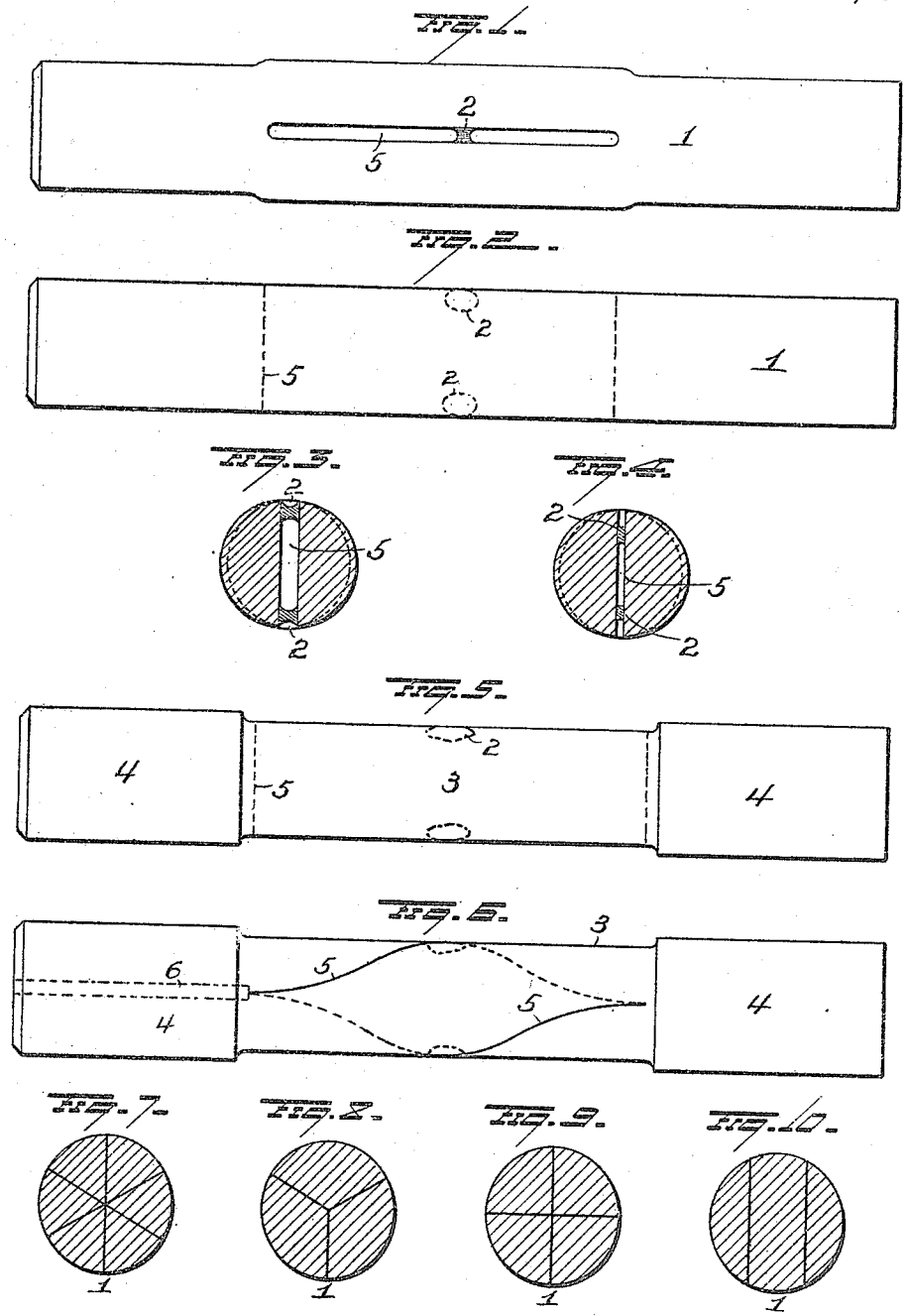

ETHAN I. DODDS, OF PITTSBURGH, PENNSYLVANIA, ASSIGNOR TO FLANNERY BOLT COMPANY, OF PITTSBURGH, PENNSYLVANIA.

STAY-BOLT FOR BOILERS.

1,229,910.

Specification of Letters Patent.

Patented June 12, 1917.

Application filed November 30, 1914. Serial No. 874,820.

*To all whom it may concern:*

Be it known that I, ETHAN I. DODDS, a citizen of the United States, and a resident of Pittsburgh, in the county of Allegheny and State of Pennsylvania, have invented certain new and useful Improvements in Stay-Bolts for Boilers; and I do hereby declare the following to be a full, clear, and exact description of the invention, such as will enable others skilled in the art to which it appertains to make and use the same.

My invention relates to an improvement in stay bolts for boilers.

Heretofore bolts have been made up of a plurality of independent longitudinal members, or with the shank, or portion thereof between the heads, composed of a plurality of separated members, but experiments have demonstrated that a bolt so constructed will buckle or become distorted in applying them to the boiler sheets.

The object of this invention is to provide a bolt that will be flexible laterally, to accommodate itself to the lateral twisting or torsional strains imparted to it by the unequal movements of the boiler sheets, but which will be sufficiently rigid against longitudinal stresses to prevent any buckling or bending of the shank while being applied or driven into place.

With this object in view my invention consists in the details of construction as will be more fully described and pointed out in the claims.

In the accompanying drawings, Figure 1 is a view of the blank slotted centrally the members formed by slotting, being spot welded together at isolated points; Fig. 2 is a view of the same, after the slot has been nearly closed; Fig. 3 is a view in section through Fig. 1; Fig. 4 is a view in section through Fig. 2; Fig. 5 is a view showing the shank drawn down and the ends or heads enlarged; Fig. 6 shows the bolt shank after it has been twisted and Figs. 7, 8, 9 and 10 are sectional views showing a bolt shank slotted in different ways.

In the manufacture of this bolt, a bar 1 preferably cylindrical is subjected to an upsetting heat and is slotted clear through that portion of the bar which will constitute the shank of the bolt. This slotting of the blank produces a spreading or dilation of the latter, after which the two half round sections formed by slotting the bar are connected by flash or spot welding as at 2, the said welds being located centrally with relation to the long axis of the slot and adjacent the outer edges of the slot as clearly shown in Figs. 1 and 3. This spreading or dilation of the bar is reduced, and the slot substantially closed by dies or hammering, while the bar is still hot, but not at a welding heat, so as to restore the blank to approximately its original size as shown in Fig. 4, without welding the side walls of the slot together.

While the bolt is still hot, or after it has been reheated, but not to a welding heat, it is reduced at its center as shown in Fig. 5, after which the reduced central or shank portion 3 of the bolt between the heads 4, is twisted about 180° so that the slot 5 will be in the shape of a spiral half way around the shank. The heads 4 are then threaded and a tell tale hole 6 drilled in the outer head.

Instead of a single slot dividing the shank into two members, it may be divided into three members as shown in Figs. 8 and 10; into four members as in Fig. 9 and into a greater number as in Fig. 7. In each instance however the members formed by slotting are connected by welding so as to form a structure sufficiently rigid to withstand all longitudinal strains to which the bolt may be subjected in placing it in position.

Experiments have demonstrated that a bolt made in section is the ideal bolt for connecting boiler sheets, as it is sufficiently flexible to permit of the unequal movements of the sheets without unduly straining either, but they will buckle under collapsing stresses and are not sufficiently rigid in all cases to withstand the vibrations and stresses to which they are subjected. It is also difficult to apply them to the sheets and particularly so if any of the threads bind. With my construction the welding together of the members is sufficient to take care of the twisting or torsional strains to which the bolts are subjected when applying them to the sheets, and prevent the members of the shank from spreading or bulging under the longitudinal and torsional stresses on the bolt. After the bolt has been applied, the vibrations and strains to which it is subjected may rupture the welds, thus transforming the shank into a plurality of members disconnected except at the ends, and which will be free to give or yield in all lateral directions.

While the exact sequence of steps may not be essential I prefer to heat the bar or blank to a mellow heat, and shape it in dies or other suitable tools to produce the enlarged head at each end and if desired also reduce the shank. The shank is then pierced and the slots welded as explained after which the slots or impiercements are closed, the shank twisted between its enlarged ends and the bolt smoothed and straightened between dies.

Having fully described my invention what I claim as new and desire to secure by Letters-Patent, is:—

1. As a new article of manufacture, a stay bolt shank composed of a plurality of members, the said members being welded together at points intermediate the ends, thus leaving slots between the ends of the bolts and the intermediate welds.

2. As a new article of manufacture, a stay bolt shank composed of a plurality of members welded together at isolated points intermediate its ends, thus leaving slots between the ends of the bolts and the intermediate welds, the said shank being turned into spiral shape.

3. As a new article of manufacture, a stay bolt composed of two heads and an intermediate shank the latter being slotted clear through and then welded at isolated points adjacent the outer margins of the slots, the said shank being twisted into spiral form.

4. A stay bolt slotted intermediate its ends the side walls of the slot being welded at isolated points intermediate the ends of the slot.

In testimony whereof, I have signed this specification in the presence of two subscribing witnesses.

ETHAN I. DODDS.

Witnesses:
 EDWIN SPENCER RYCE,
 WM. CHARLES BINGHAM.

Copies of this patent may be obtained for five cents each, by addressing the "Commissioner of Patents, Washington, D. C."